United States Patent
Han et al.

(10) Patent No.: US 12,460,963 B2
(45) Date of Patent: Nov. 4, 2025

(54) GUNSHOT DETECTION VIA CLASSIFICATION USING DEEP LEARNING AND FIBER SENSING TECHNOLOGIES

(71) Applicant: NEC Laboratories America, Inc., Princeton, NJ (US)

(72) Inventors: Shaobo Han, Princeton, NJ (US); Ming-Fang Huang, Princeton, NJ (US); Jian Fang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 18/333,490

(22) Filed: Jun. 12, 2023

(65) Prior Publication Data

US 2023/0400350 A1 Dec. 14, 2023

Related U.S. Application Data

(60) Provisional application No. 63/402,140, filed on Aug. 30, 2022, provisional application No. 63/350,911, filed on Jun. 10, 2022.

(51) Int. Cl.
*G01H 9/00* (2006.01)
*F41A 19/01* (2006.01)
*G01D 5/353* (2006.01)

(52) U.S. Cl.
CPC .......... *G01H 9/004* (2013.01); *F41A 19/01* (2013.01); *G01D 5/35361* (2013.01)

(58) Field of Classification Search
CPC ...... G01H 9/004; F41A 19/01; G01D 5/35361
USPC ........................................................ 73/655
See application file for complete search history.

(56) References Cited

U.S. PATENT DOCUMENTS

| | | | |
|---|---|---|---|
| 11,566,937 B2 * | 1/2023 | Ip | G01B 9/02015 |
| 2020/0370950 A1 * | 11/2020 | Ip | G01B 9/02015 |
| 2021/0318162 A1 * | 10/2021 | Hu | G01K 11/32 |
| 2021/0318166 A1 * | 10/2021 | Ding | G01H 9/004 |

(Continued)

FOREIGN PATENT DOCUMENTS

| | | | | |
|---|---|---|---|---|
| CN | 119503392 A | * | 2/2025 | B65G 15/60 |
| JP | 2024516568 A | * | 4/2024 | G01D 5/35361 |

OTHER PUBLICATIONS

Arjun et al., Panchendriya: A Multi-sensing framework through Wireless Sensor Networks for Advanced Border Surveillance and Human Intruder Detection, Proceedings of the Fourth International Conference on Communication and Electronics Systems (ICCES 2019), pp. 295-298 (Year: 2019).*

(Continued)

*Primary Examiner* — Stephanie E Bloss
*Assistant Examiner* — Kevin C Butler
(74) *Attorney, Agent, or Firm* — Joseph Kolodka; Vincent Duffy (57) ABSTRACT

A machine learning (ML)/artificial intelligence (AI) based distributed fiber optic sensing (DFOS) system and method providing detection and localization of gunshot events. In addition to the ML/AI DFOS, a signal processing pipeline that compresses an audible distributed acoustic sensing (DAS) waveform data into a small set of features that protects privacy of individuals while preserving the utility of acoustic events to detect the gunshot events and discriminate same from other events. A data-driven deep learning approach automatically predicts acoustic event types with higher accuracy that realized by prior art methods.

18 Claims, 12 Drawing Sheets

(56) References Cited

U.S. PATENT DOCUMENTS

| | | | | |
|---|---|---|---|---|
| 2022/0228948 A1* | 7/2022 | Huang | ............... | G08B 13/186 |
| 2023/0125456 A1* | 4/2023 | Ding | ............... | G08G 1/04 |
| | | | | 340/933 |
| 2023/0375375 A1* | 11/2023 | Ding | ............... | G01H 9/004 |
| 2023/0400350 A1* | 12/2023 | Han | ............... | G01D 5/35358 |
| 2024/0241275 A1* | 7/2024 | Han | ............... | G01V 1/001 |
| 2024/0248228 A1* | 7/2024 | Huang | ............... | G01V 1/226 |

OTHER PUBLICATIONS

Ming-Fang Huang et al., Field Tests of Impulsive Acoustic Event Detection, Localization, and Classification over Telecom Fiber Networks, OECC 2022 PDP, Jul. 3, 2022 (Year: 2022).*

\* cited by examiner

| Name | Crackers | Cannon | Fountain cannon | High altitude fireworks |
|---|---|---|---|---|

| Data collected location | Sensor Type | Notes |
|---|---|---|
| Location – 1 | Fiber-based acoustic enhancer | |
| Location – 2 | Fiber-based acoustic enhancer | |
| Location – 3 | Fiber-based acoustic enhancer | |
| Location – 4 | Fiber-based acoustic enhancer | |
| Location – 5 | Fiber Coil | Coil after Location – 1 |
| Location – 6 | Fiber Coil | Coil after Location – 2 |
| Location – 7 | Fiber Coil | Coil before Location – 3 |
| Location – 8 | Fiber Coil | Coil before Location – 4 |

GUNSHOT DETECTION VIA CLASSIFICATION USING DEEP LEARNING AND FIBER SENSING TECHNOLOGIES

CROSS-REFERENCE TO RELATED APPLICATIONS

This application claims the benefit of U.S. Provisional Patent Application Ser. No. 63/350,911 filed Jun. 10, 2022, and U.S. Provisional Patent Application Ser. No. 63/402,140 filed Aug. 30, 2022, the entire contents of each of which is incorporated by reference as if set forth at length herein.

FIELD OF THE INVENTION

This application relates generally to distributed fiber optic sensing (DFOS) systems, methods, structures, and related technologies. More particularly, it pertains to artificial intelligence (AI) based DFOS systems and methods providing detection and localization of gunshots.

BACKGROUND OF THE INVENTION

Distributed fiber optic sensing (DFOS) technologies including Distributed Acoustic Sensing (DAS), Distributed Vibration Sensing (DVS), and Distributed Temperature Sensing (DTS) are known to be quite useful for sensing acoustic events, vibrational events, and temperatures in a plethora of contemporary applications.

The ability to detect gunshot events in public areas such as cities, schools, hotels, sporting venues, etc., has become critically important to provide notification of such events to appropriate first responders.

SUMMARY OF THE INVENTION

An advance in the art is made according to aspects of the present disclosure directed to artificial intelligence (AI) based DFOS systems and methods providing detection and localization of gunshot events.

In sharp contrast to the prior art, our inventive systems and methods employ DFOS and machine learning techniques along with a signal processing pipeline that compresses an audible distributed acoustic sensing (DAS) waveform data into a small set of features that protects privacy of individuals while preserving the utility of acoustic events to detect gunshot events. Our inventive utilization of a data-driven deep learning approach automatically predicts acoustic event types with higher accuracy that realized by prior art methods.

DETAILED DESCRIPTION OF THE INVENTION

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGURES comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length.

As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1A:
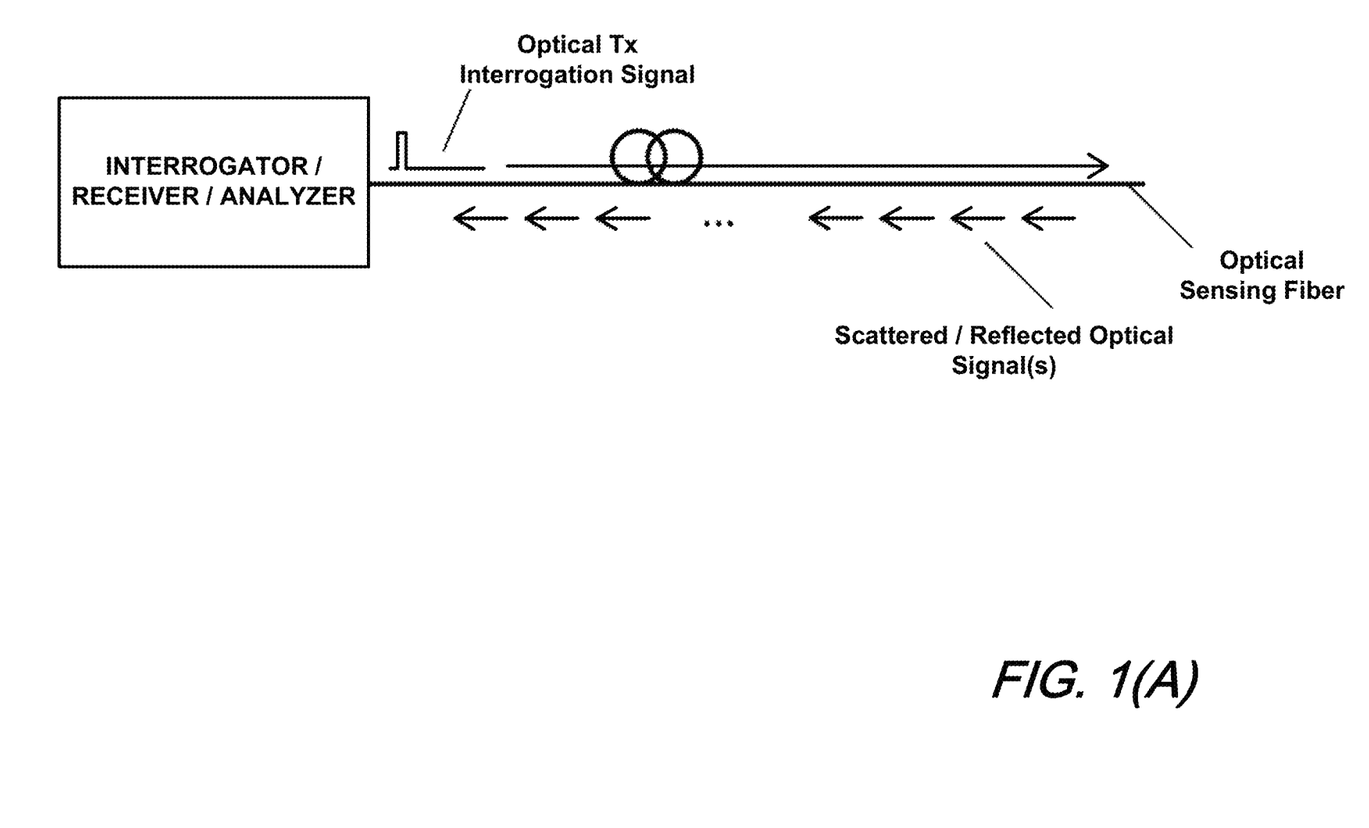
FIG. 1(A) and FIG. 1(B) are schematic diagrams showing an illustrative prior art uncoded and coded DFOS systems.
Figure 1B:
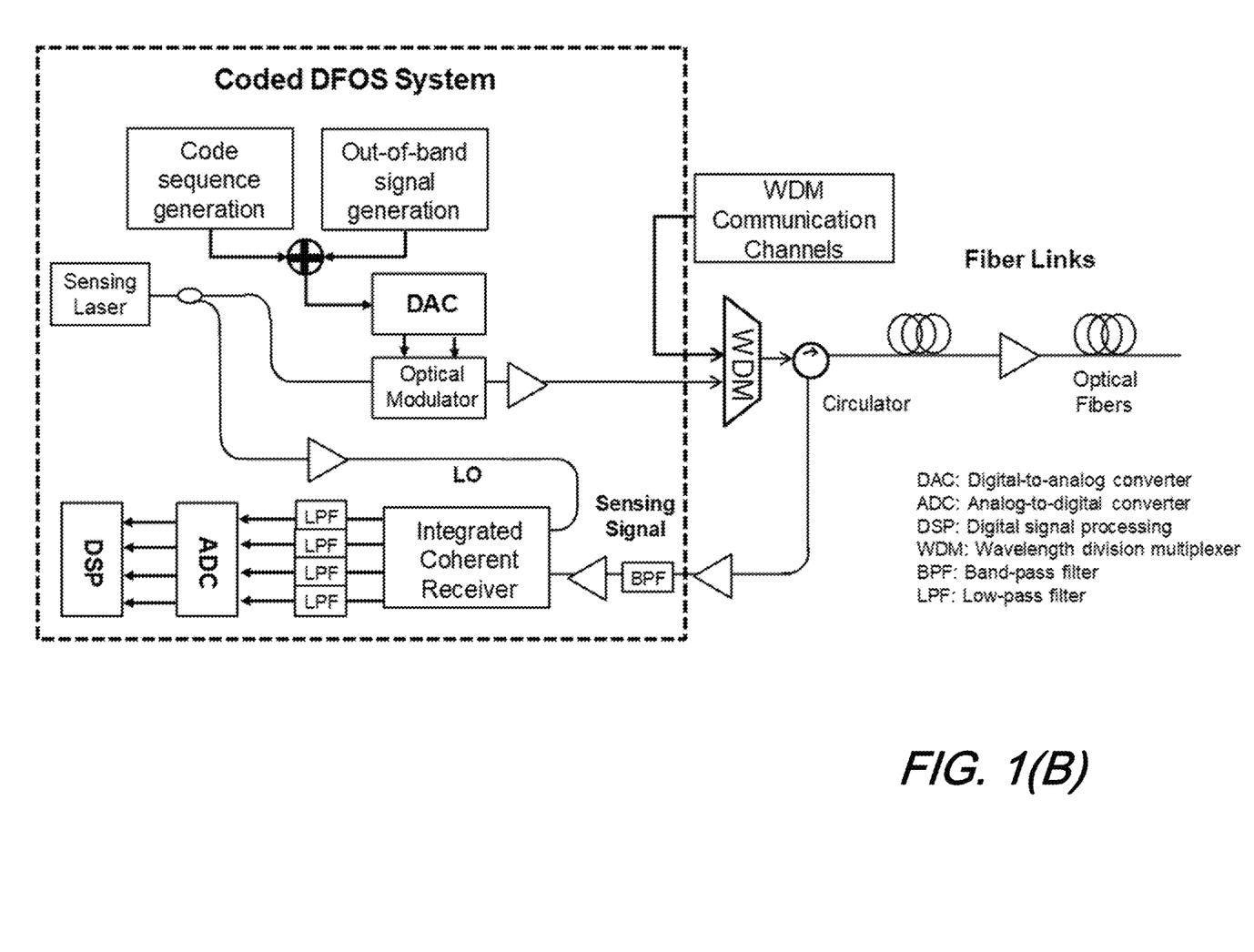

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal events along the length of the optical sensing fiber.

We note at this point that contemporary methods to detect gunshots generally utilize many electrical acoustic microphones installed in a monitoring area. There are however, a number of disadvantageous issues associated with such systems including: the need to install 20-25 microphones per square mile, therefore electrical power and data transmission are issues; false alarms—which send first responders on responses into areas for no reason on high alert expecting to confront dangerous situation, especially those resulting from fireworks or other celebratory activities, distract those first responders from actual emergency situations. Such false responses result in aggressive activities that may disturb lawful citizen activity. Finally, such systems have a low rate of actual gunshot detection.

Such microphone installations exhibit increased maintenance costs and raise significant privacy concerns. Additionally false alarms distort reporting statistics an provide misleading data regarding actual gunshot events.

Accordingly, our inventive methods and systems according to the present disclosure employing a distributed fiber optic sensor and machine learning analysis advantageously detects gunshot events; distinguishes such gunshot events from fireworks and/or celebratory activities and distinguishes such gunshot events from car alarms/mechanical noises that may fool microphone-based systems and methods.

As we shall show and describe, our inventive system and method utilizes a novel signal processing pipeline that compresses audible DAS waveform data into a small set of features that preserve the utility of recorded acoustic events, coupled with a data-driven deep learning operation that automatically predicts type of events with high accuracy—while simultaneously preserving privacy concerns of affected citizenry.

Operationally, our approach disclosed herein: First, extracts Mel-frequency cepstral coefficients (MFCCs) from short-time Fourier transform (STFT) of a DAS waveform; Second, a dedicated convolutional neural network for classification, views the DAS MFCC spectrogram as image patches and utilizes time-frequency information that advantageously is more effective than other baseline methods such as Random forest; and Finally, our inventive approach enables real-time continuous monitoring of gunshots or other safety-concerning events in those areas having optical fibers while requiring computing resources with only limited resources.

Further features and advantages of our inventive approach include first/novel use of AI/ML algorithms to detect gunshot events and distinguish those events from gunshot-like events. Additionally, our inventive approach employs fiber-based acoustic enhancers to improve detection rate and reduce false alarms. Finally, our inventive approach obtains and analyzes short-term power spectrum of a sound and signatures of the acoustic/vibration patterns which avoid privacy concerns of concerned citizens.

Figure 2:
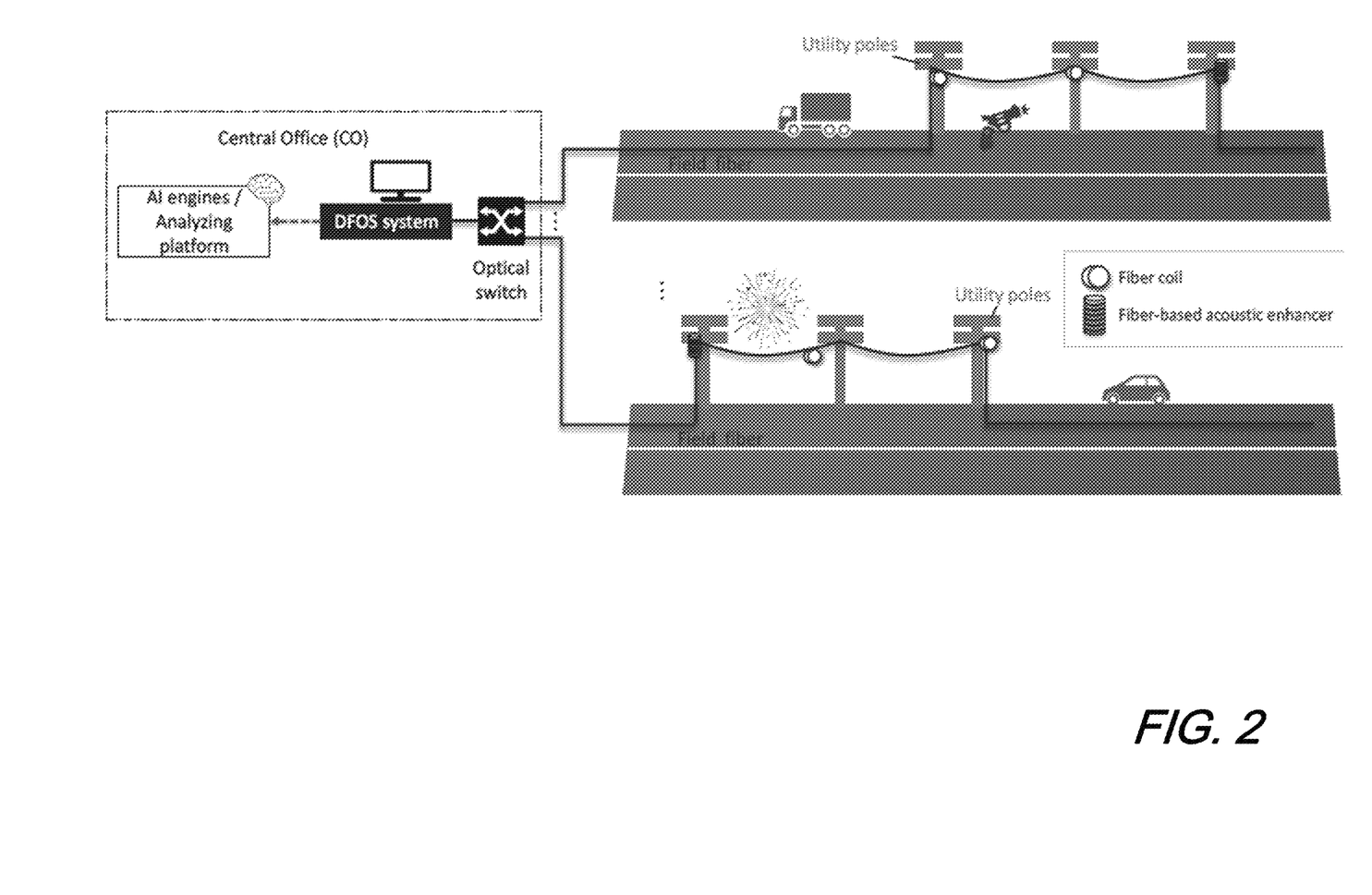
FIG. 2. Is a schematic diagram showing an illustrative system setup for a DFOS system with AI engine/analyzer according to aspects of the present disclosure.

FIG. 2. Is a schematic diagram showing an illustrative system setup for a DFOS system with AI engine/analyzer according to aspects of the present disclosure. With reference to that figure, we note that our systems and methods may use existing deployed optical fiber such as those already deployed along highways and roadways for traffic surveillance cameras and data transmission. Note that according to an aspect of the present disclosure, DFOS operations, which advantageously can be either distributed acoustic sensing (DAS) or distributed vibration sensing (DVS), is set up in the control office/central office (CO) for remote monitoring of an entire optical sensor fiber route. The DFOS system is shown integrated with an optical switch and connected to a pair of optical sensor fibers to provide sensing functions along multiple fiber routes. The optical fibers can be a dark fiber or operational fiber carrying live telecommunications (or other) traffic. After an event is detected, an alarm is triggered and danger assessment is reported to responsible entities such as traffic control office, police, and fire departments.

We note that sensing signals used for gunshot detection and classification is generally detected from field aerial cable sections—those suspended aerially from utility poles or other structures. Advantageously, fiber coils or fiber-based acoustic enhancer(s)—which have a mandrel to improve signal-to-noise ratio (SNR) may be employed.

As we shall show and describe, we have evaluated our inventive systems and method according to aspects of the present disclosure including:

Vehicle Induced False Alarms:
  Vehicle door slamming, and
  Vehicle car alarms.
Fireworks Induced False Alarms:
  Firecrackers,
  Cannons,
  Fountain cannons; and
  High altitude fireworks.

Figure 3:
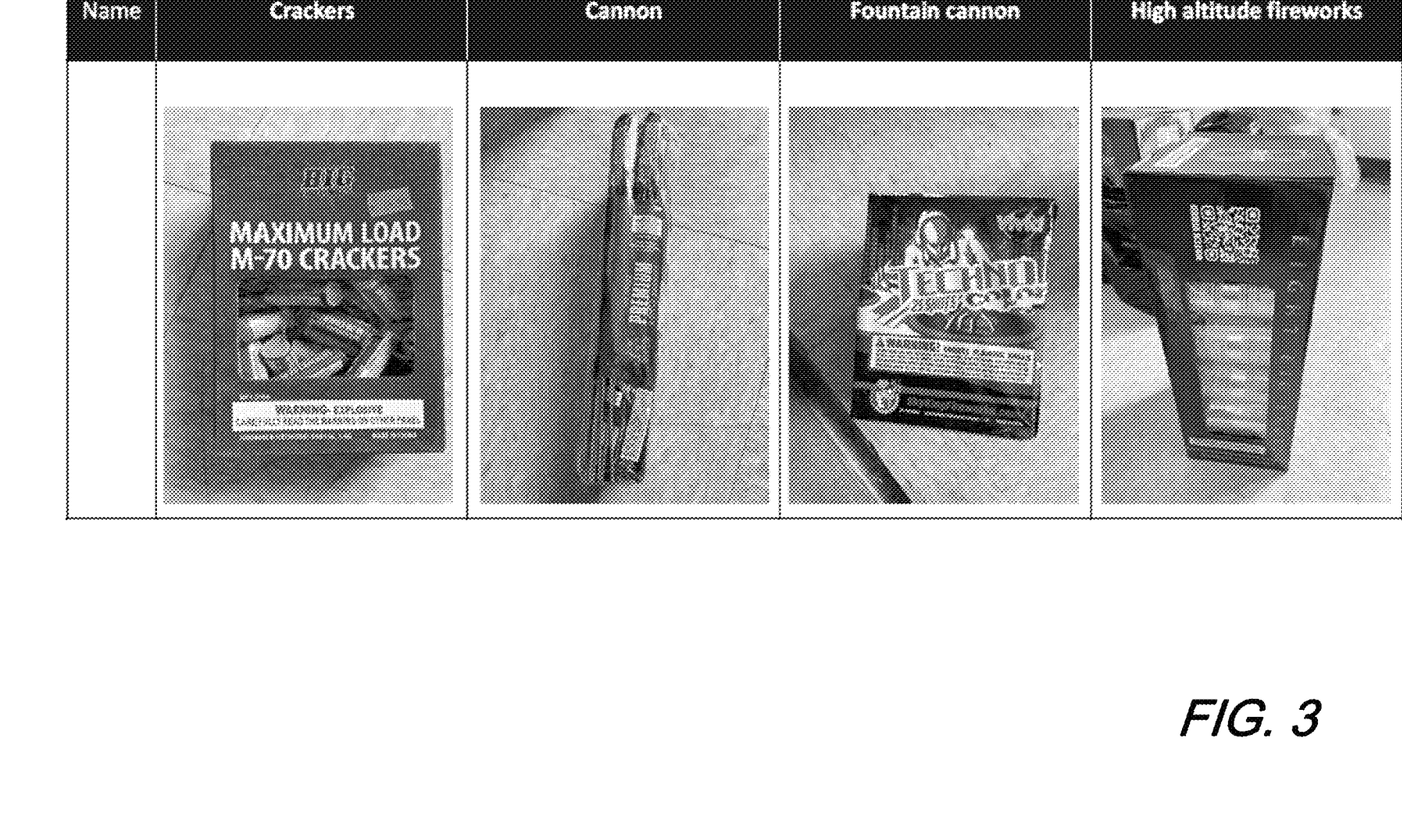
FIG. 3 shows a series of photo-illustrations of fireworks tested according to aspects of the present disclosure.

FIG. 3 shows a series of photo-illustrations of fireworks tested according to aspects of the present disclosure which includes the devices identified above.

Figure 4A:
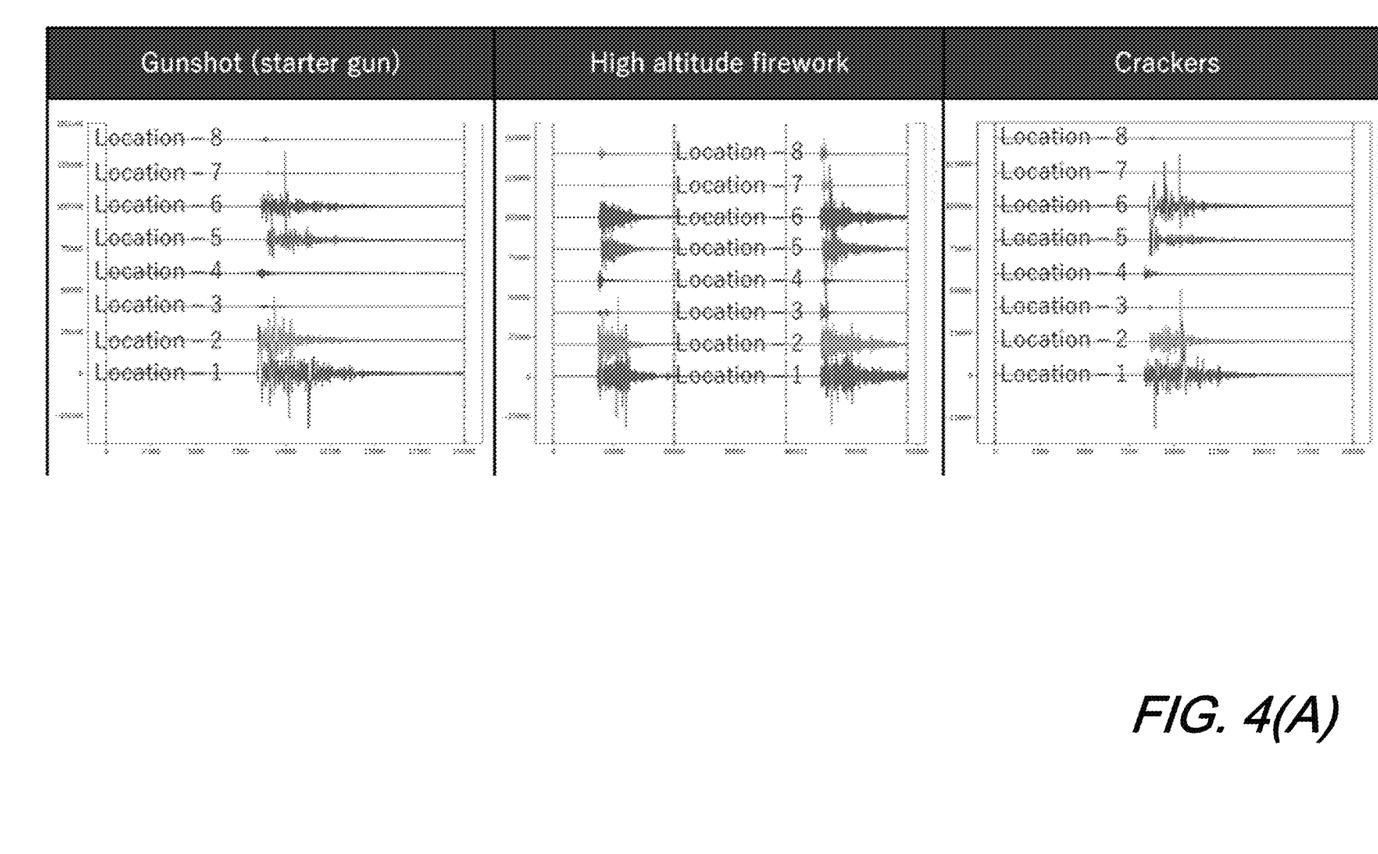
FIG. 4(A), and FIG. 4(B) are plots illustrating DAS recorded waveforms of acoustic events according to aspects of the present disclosure.
Figure 4B:
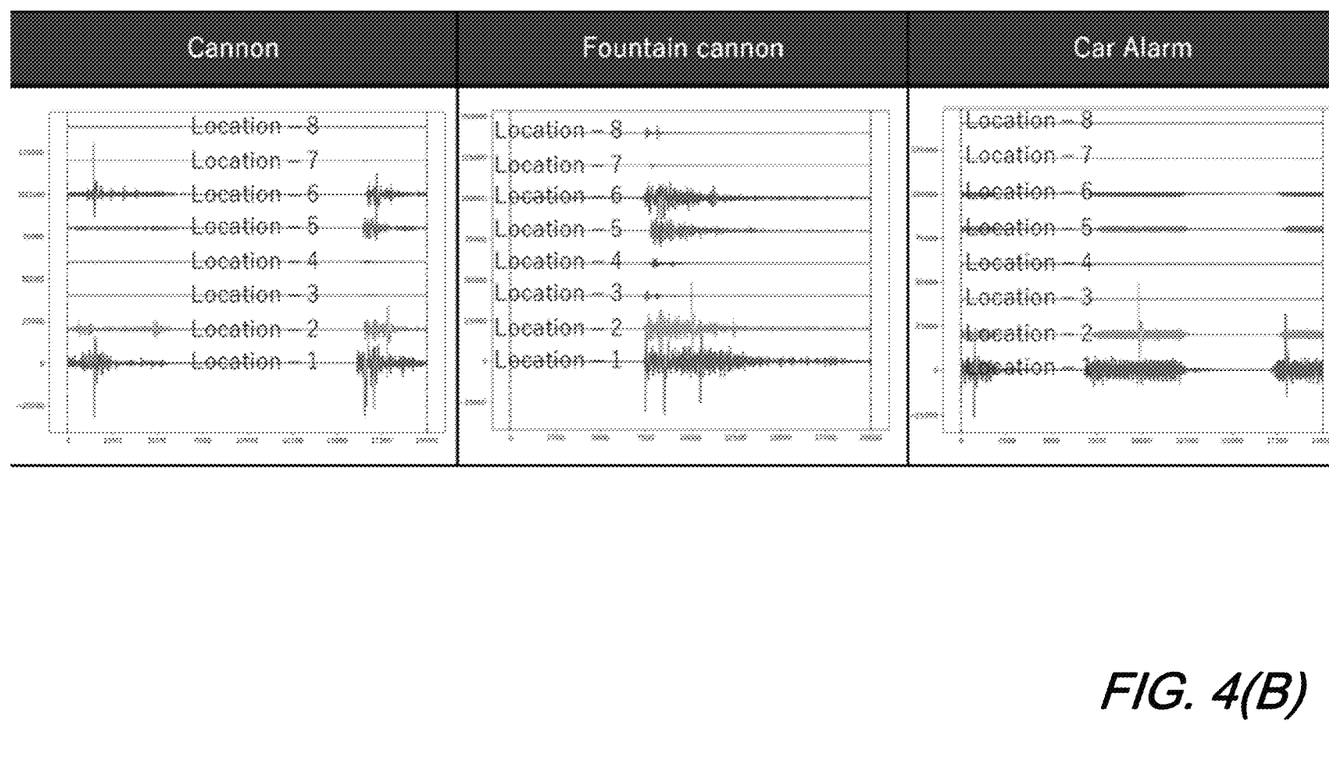

FIG. 4(A), and FIG. 4(B) are plots illustrating DAS recorded waveforms of acoustic events according to aspects of the present disclosure. As may be observed, these exemplary illustrative samples for six different types of events, recorded by DAS. The data are collected at a high sampling rate of 20 kHz. Two types of sensors are employed: 1) a fiber-based acoustic enhancer, and 2) a fiber coil readily available in the field. Detailed information is summarized in FIG. 4(C), which shows exemplary samples for six different types of events, recorded by DAS, according to aspects of the present disclosure.

Figure 4C:
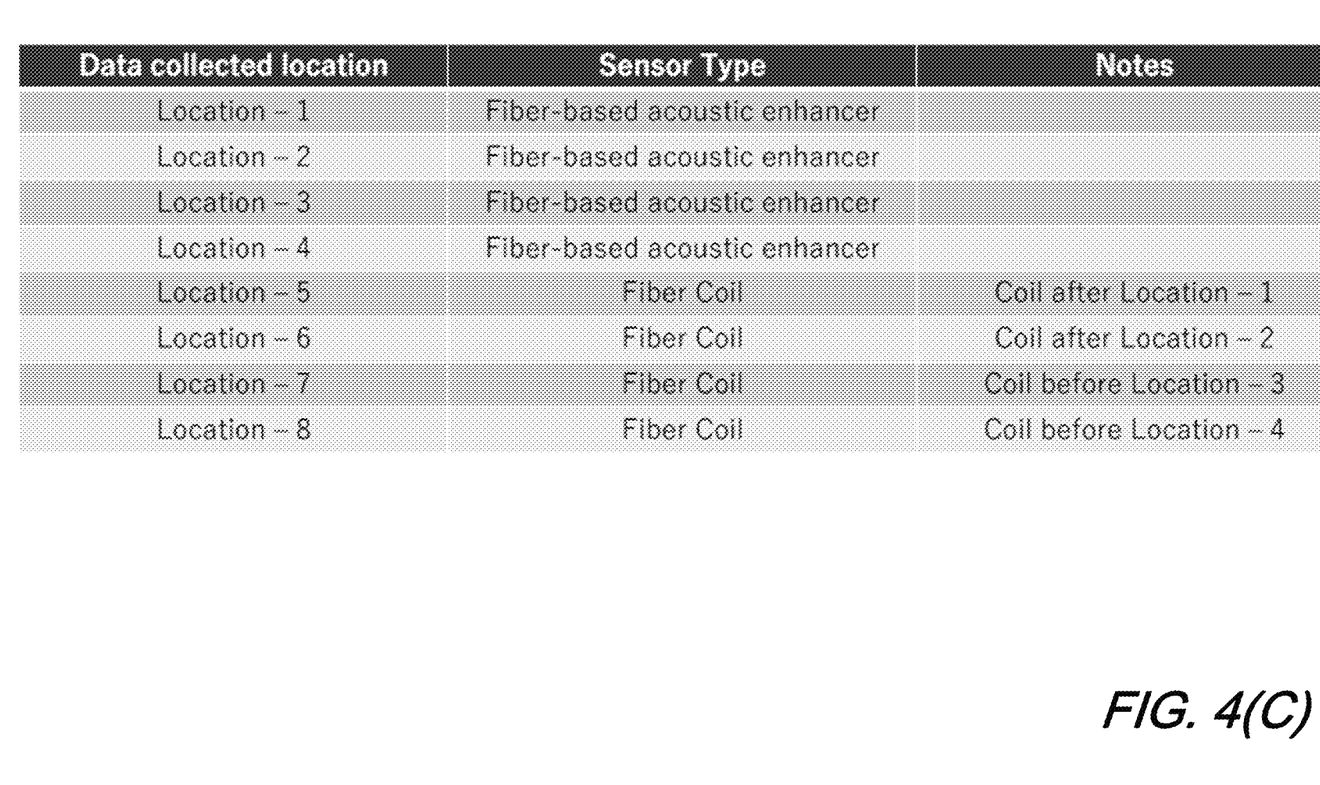
FIG. 4(C) shows exemplary samples for six different types of events, recorded by DAS, according to aspects of the present disclosure.

As illustratively shown, Locations 1-4 are detected by a fiber-based acoustic enhancer while locations 5-8 are detected by a fiber coil. Note that the fiber coil locations are positioned after respective acoustic enhancer locations.

During training, the waveform data is segmented in 1 second lengths. Each of the segments contain a single type of sound. This procedure is automated by a peak-finding algorithm.

To evaluate our inventive method, we compared different data representations, including original time series, short-time Fourier transform (STFT) with different window lengths, and MFCC. MFCC has the following advantages, which makes it particularly suitable for this use case:

First, since the sampling rate is high, most of the STFT channel information are in high frequencies. In sharp contrast, MFCC filter banks—inspired by human auditory ability—purposefully emphasizes more lower frequency channels.

Second, our representation reduces lengthy time series data into a small set of features. As a result, only a smaller scale neural network with fewer number of layers is needed. Therefore, our model can advantageously run on devices with limited computing resources.

Third, our inventive representation exhibits better data efficiency as the feature extraction part is give. Machine learning algorithms trained on it can achieve better generalization performance than those trained end-to-end on a raw waveform—due to limited training data.

Finally, fourth, our DAS technique can record various sounds from the environment with high fidelity. After processing, MFCC data are no longer audible to a human. The storage of MFCC data samples can facilitate future machine learning training—e.g., continual learning—without resulting in a loss of privacy for affected citizens.

Operationally, we employed a convolutional neural network with three convolutional layers (output channel number 6, 8, 10, kernel size 2×2, and 2×2 power 2-average pooling) and two fully-connected layers. This small-scale neural network supports real-time processing, which can run efficiently even on central processing units without GPU, lowering deployment costs. The utilization of time-frequency information by the convolutional operator is crucial.

We conducted comparison experiments, and a random forest classifier based on vectorized MFCC features leads to sub-optimal performance wherein its accuracy is lower by 3-5% as compared with our system and method.

Figure 5:
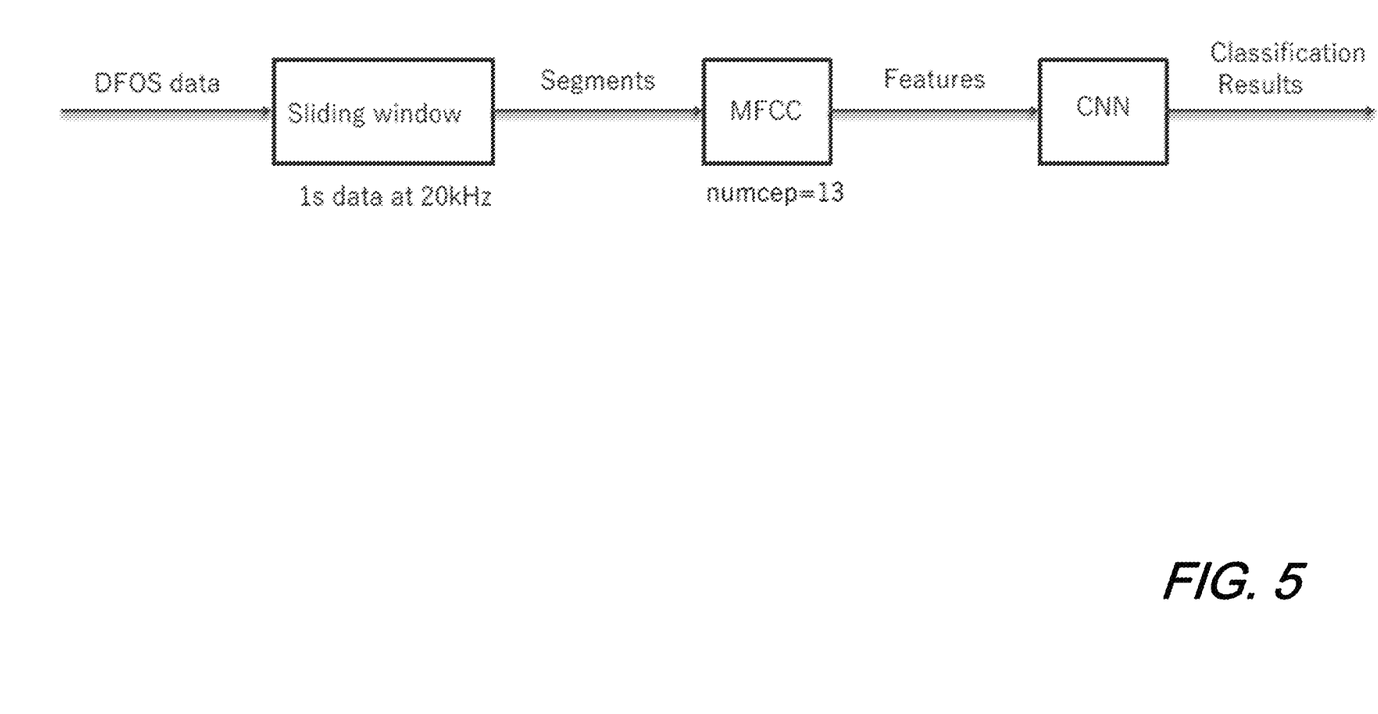
FIG. 5 is a schematic diagram showing illustrative process of sliding window-based event classification according to aspects of the present disclosure.

FIG. 5 is a schematic diagram showing illustrative process of sliding window-based event classification according to aspects of the present disclosure. As illustratively shown, DFOS data has applied a sliding window of 1s data at 20 kHz. Segments resulting therefrom undergo a MFCC wherein numcep=13 and resulting features are applied to a convolutional neural network producing classification results.

Figure 6:
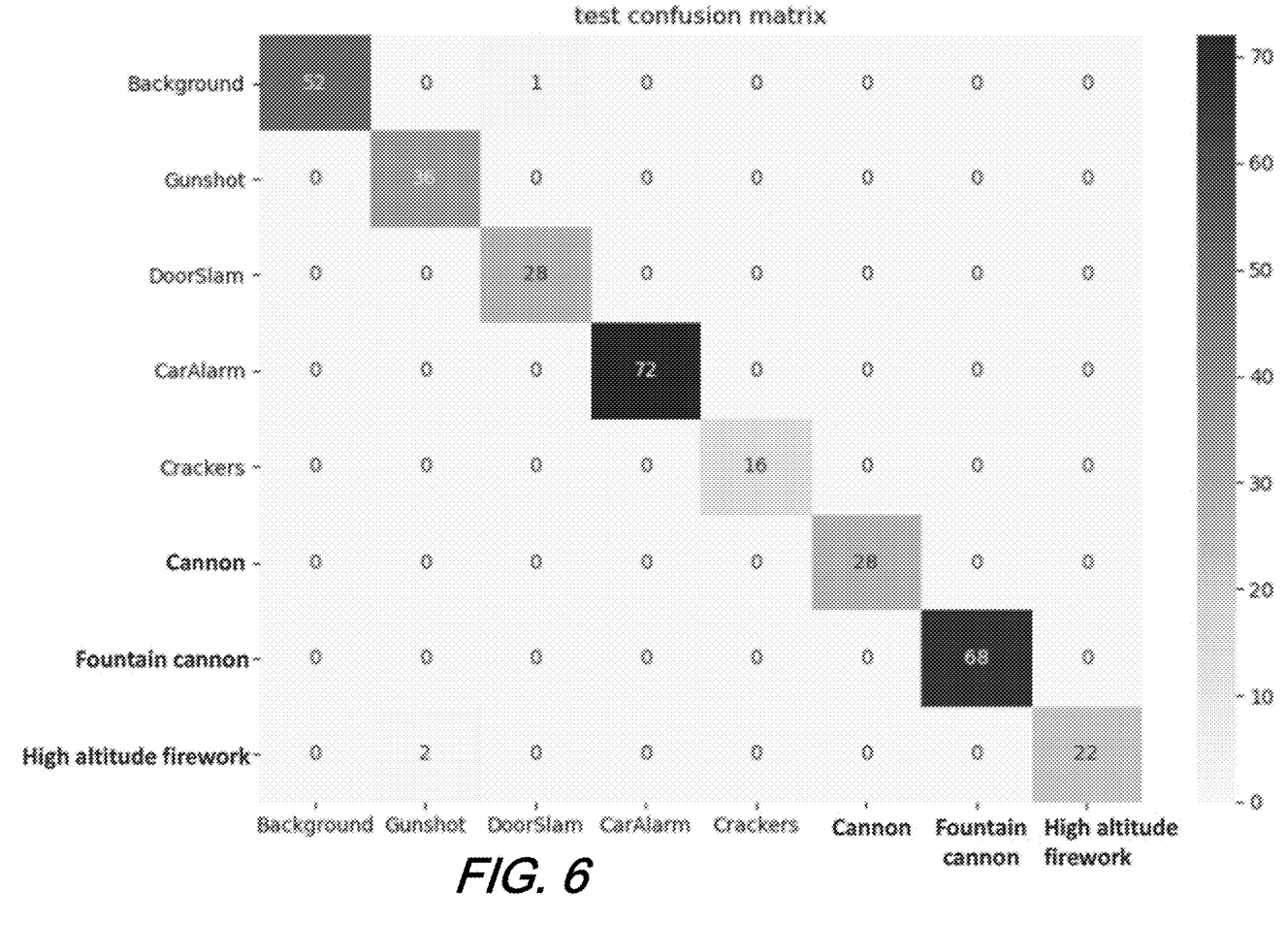
FIG. 6 shows illustrative classification results based on fiber acoustic enhancer according to aspects of the present disclosure.
Figure 7:
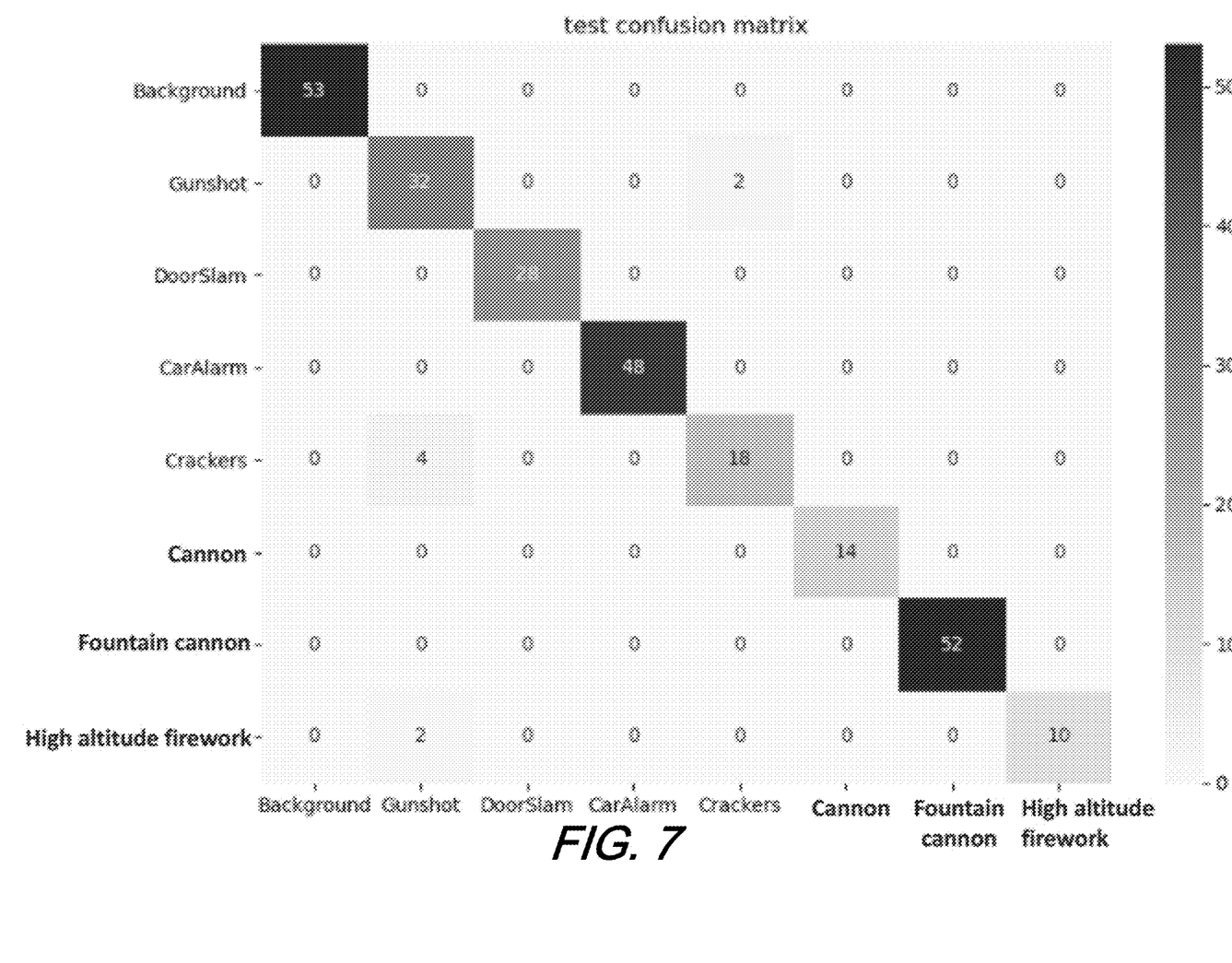
FIG. 7 shows illustrative classification results based on fiber coil according to aspects of the present disclosure.

We conducted a small-scale field experiment. Even with limited training data, our inventive approach reached a high accuracy of >99% using a fiber-based acoustic enhancer and >97% using existing aerial fiber coils. The classification results of the test data set are shown illustratively in FIG. 6, which shows illustrative classification results based on fiber acoustic enhancer according to aspects of the present disclosure, and in FIG. 7 which shows illustrative classification results based on fiber coil according to aspects of the present disclosure.

As those skilled in the art will readily appreciate, since we are using our inventive system and method via a classification approach, we can use our DFOS+AI/ML methodology for applications beyond gunshot detection. For example, any other events of interest—particularly those involving public safety such as car alarms, car break-ins, home break-ins, fireworks in prohibited areas, etc., —may be accurately monitored and responded to using our inventive systems and methods.

Figure 8:
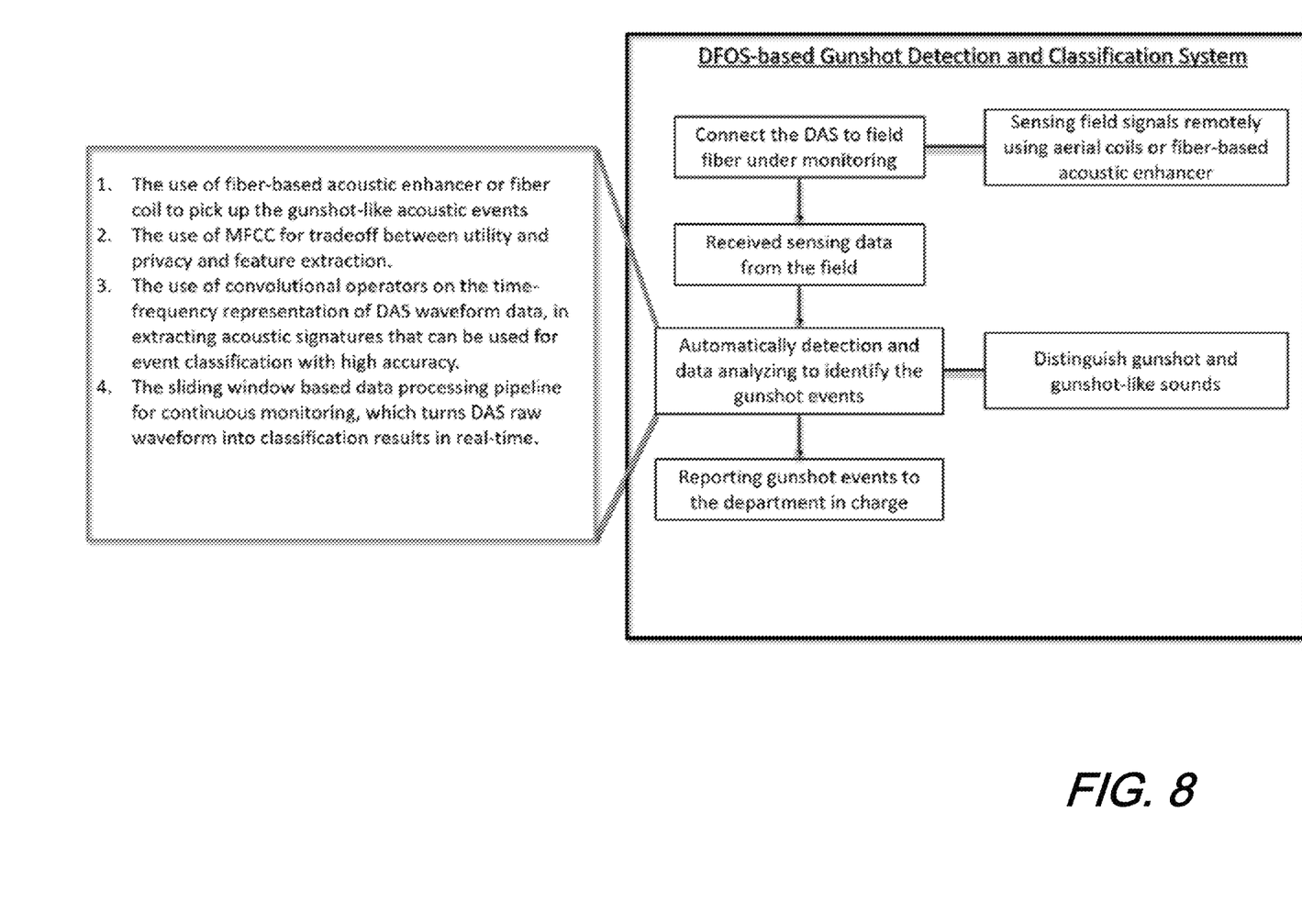
FIG. 8 is a schematic diagram showing illustrative operations of DFOS-based gunshot detection and classification according to aspects of the present disclosure.

FIG. 8 is a schematic diagram showing illustrative operations of DFOS-based gunshot detection and classification according to aspects of the present disclosure. As may be now recalled, our inventive use of fiber-based acoustic enhancers or fiber coils to pick up acoustic events coupled with our use of MFCC for an effective tradeoff between utility, privacy, and feature extraction provides substantial advantages over prior art methods. Additionally, we employ convolutional operators on the time-frequency representation of DAS waveform data, in extracting acoustic signatures that are used for event classification with high accuracy. Finally, our sliding-window based data processing pipeline allows for continuous monitoring, which turns DAS raw waveforms into classification results in real-time.

Figure 9:
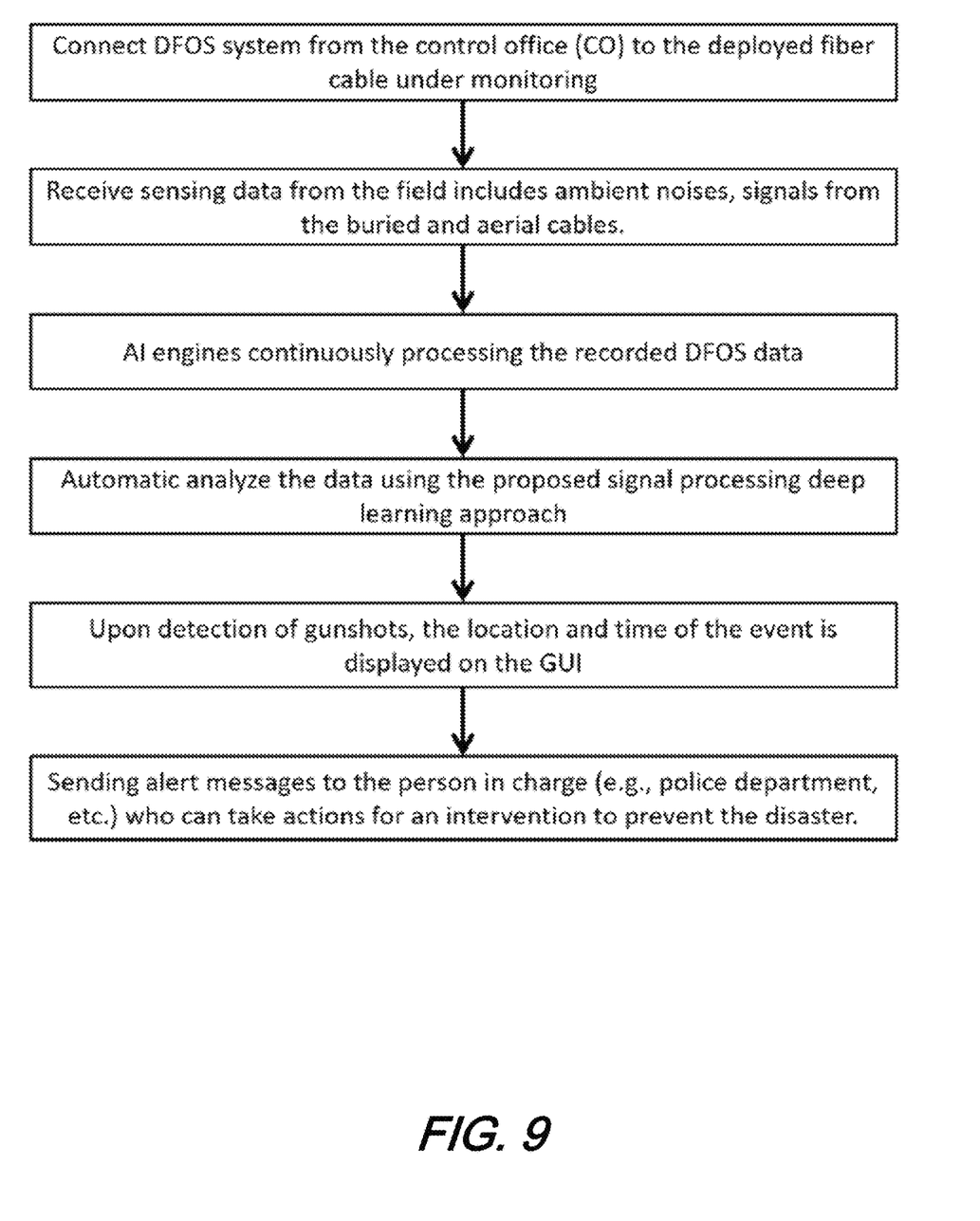
FIG. 9 shows an illustrative flow diagram of a DFOS-based gunshot detection and classification method according to aspects of the present disclosure.

FIG. 9 shows an illustrative flow diagram of a DFOS-based gunshot detection and classification method according to aspects of the present disclosure. As shown in the figure, our operational procedure includes the following. First, a DFOS system is provided which may employ deployed optical fiber cable. Such DFOS system and AI/ML analyzer may be located conveniently in a central office. Such system may further include an optical switching arrangement such that the single DFOS system and analyzer may monitor a number of separate fiber optic sensor cables simultaneously.

The system is operated and sensing data is received which includes ambient noises, signals from buried and aerial fiber optic cables. An AI engine(s) continuously processes the collected DFIS data and automatically analyzes the data using our signal processing and deep learning approach. Upon detection of gunshots, the location and time of events are displayed on a GUI. Finally, upon detection, alert messages may be sent to first responders including police and/or fire for intervention actions.

To evaluate our inventive system and methods, an experiment at a smart city test facility including a test bed, where three fiber coils (Coil 1 to Coil 3) each comprising of m length of cable, and a fiber-based signal enhancer (FSE) were connected by a fiber cable. Note that an FSE comprises m length of fiber coiled in a small volume to increase coupling of external vibration to the fiber. A starter gun was used as the impulsive acoustic source. To recover the vibration waveform, we used a DAS with a spatial resolution of xx m and acoustic sampling rate of xx Hz. The recovered vibration was then filtered between x and y Hz. Correlating of the waveforms recovered at the coils and the FSE allowed estimation of the time difference of arrival (TDoA), from which the position of the acoustic source was triangulated. Good agreement between the actual and estimated positions of the acoustic was observed. The position estimation error in each case was less than 1 meter.

A second field experiment was conducted at a telecom facility and the test bed. A newly laid fiber cable runs from a central office (CO) through a buried section, becoming an aerial cable suspended on utility poles. Four fiber coils and two FSEs susceptible to impulsive acoustic sound were positioned along the length of the fiber cable. We constructed a multimodal detection system using the cable, FSEs and two cameras mounted at different positions overlooking the test bed including Camera 1, a regular camera, and Camera 2, a fisheye camera with an enlarged field of view. When an impulsive sound is generated, it is detected by the DAS and classified by the AI in real-time. For events identified as threatening, the cameras are triggered. A person at an estimated position was identified by visual analytics with an alarming boundary box. To reduce the probability of false alarms, a machine learning classifier based on a convolution neural network (CNN) was implemented on the short-term power spectrum of the vibrations recorded by the DFOS and trained on different impulsive acoustic events based. Confusion matrices obtained for different vibrations recovered, show high classification accuracy >97% and >99% was obtained, respectively, using the vibration waveform recovered at the fiber coils and the FSE.

We now note that we have successfully demonstrated the detection, localization and classification of impulsive acoustic events over deployed fiber optic cables using DFOS. Using spatio-temporal correlation and time-of-flight analysis, we demonstrated impulsive event localization with accuracy better than 1 m in a test bed comprising of fiber coils and a fiber-based signal enhancer. We also demonstrated sensing fusion by pairing DFOS with cameras. By using CNN-based event classifier to identify threats, and cross-correlating its estimated position with people identified by visual analytics, false alarms can be reduced.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for detecting impulsive events using distributed fiber optic sensing (DFOS), the method comprising:
   providing the DFOS system including:
     a length of optical sensing fiber;
     an optical interrogator configured to generate optical pulses, introduce the generated optical pulses into the optical sensing fiber and receive Rayleigh reflected signals from the optical sensing fiber;
     an artificial intelligence (AI) analyzer configured to analyze the Rayleigh reflected signals received by the optical interrogator and determine the existence and nature of the impulsive events;
   operating the DFOS system and determining existence and nature of the impulsive events; and
   distinguishing, from their determined nature, impulsive events requiring an intervention from impulsive events requiring no intervention.

2. The method of claim 1 wherein the provided DFOS system length of optical sensing fiber includes both aerial and underground lengths of optical sensing fiber.

3. The method of claim 2 wherein the DFOS system length of optical sensing fiber includes one or more fiber coils and one or more fiber-based acoustic enhancers.

4. The method of claim 3 wherein the received Rayleigh reflected signals are processed into a time series data.

5. The method of claim 4 wherein the time series data undergo a Short-time Fourier Transform (STFT) processing producing STFT data.

6. The method of claim 5 where the STFT data is processed to extract Mel-frequency cepstral coefficients (MFCCs).

7. The method of claim 6 wherein the MFCCs are presented to a convolutional neural network (CNN) for classification.

8. The method of claim 7 wherein classifications produced by the CNN are used to determine an intervention.

9. The method of claim 8 wherein the DFOS system comprises an additional length of optical sensing fiber, optically isolated from the length of optical sensing fiber.

10. The method of claim 9 wherein the DFOS system includes an optical switch interposed between the optical interrogator, the length of optical fiber and the additional length of optical sensing fiber.

11. A system for detecting impulsive events using distributed fiber optic sensing (DFOS), the system comprising:
   the DFOS system including:
     a length of optical sensing fiber;
     an optical interrogator configured to generate optical pulses, introduce the generated optical pulses into the optical sensing fiber and receive Rayleigh reflected signals from the optical sensing fiber;
     an artificial intelligence (AI) analyzer configured to analyze the Rayleigh reflected signals received by the optical interrogator and determine the existence and nature of the impulsive events and distinguish, from their determined nature, impulsive events requiring an intervention from impulsive events requiring no intervention.

12. The system of claim 11 wherein the provided DFOS system length of optical sensing fiber includes both aerial and underground lengths of optical sensing fiber.

13. The system of claim 12 wherein the DFOS system length of optical sensing fiber includes one or more fiber coils and one or more fiber-based acoustic enhancers.

14. The system of claim 13 further configured to process the received Rayleigh reflected signals into a time series data, process the time series data via a Short-time Fourier Transform (STFT) processing producing STFT data, and processing the STFT data to extract Mel-frequency cepstral coefficients (MFCCs).

15. The system of claim 14 further configured to present the MFCCs to a convolutional neural network (CNN) for classification.

16. The system of claim 15 wherein classifications produced by the CNN are used to determine an intervention.

17. The system of claim 16 further comprising an additional length of optical sensing fiber, optically isolated from the length of optical sensing fiber.

18. The system of claim 17 further comprising an optical switch interposed between the optical interrogator and the length of optical fiber and the additional length of optical sensing fiber.

\* \* \* \* \*